United States Patent [19]

Schneider

[11] Patent Number: 5,127,641
[45] Date of Patent: Jul. 7, 1992

[54] AIR SPRING HAVING A SLEEVE-LIKE FLEXIBLE MEMBER

[75] Inventor: Eckhard Schneider, Lehrte, Fed. Rep. of Germany

[73] Assignee: Continental Aktiengesellschaft, Hannover, Fed. Rep. of Germany

[21] Appl. No.: 659,097

[22] Filed: Feb. 22, 1991

[30] Foreign Application Priority Data

Mar. 2, 1990 [DE] Fed. Rep. of Germany ....... 4006480

[51] Int. Cl.⁵ .............................................. F16F 9/00
[52] U.S. Cl. .................. 267/64.270; 267/122
[58] Field of Search .......... 267/64.27, 35, 122, 267/292, 141; 92/98 R, 255, 99

[56] References Cited

U.S. PATENT DOCUMENTS

| | | | |
|---|---|---|---|
| 4,657,229 | 4/1987 | Thurow | 267/122 X |
| 4,673,168 | 6/1987 | Warmuth et al. | 267/64.27 |
| 4,890,823 | 1/1990 | Keschinat et al. | 267/64.27 |

FOREIGN PATENT DOCUMENTS 1220934 3/1986 U.S.S.R. ............................ 267/35

Primary Examiner—Joseph F. Peters, Jr.
Assistant Examiner—Carla Mattix
Attorney, Agent, or Firm—Walter Ottesen

[57] ABSTRACT

An air spring having a sleeve-like flexible member made of elastomeric material. A beadless end portion of the flexible member is attached to a mount by being clamped between the mount and a clamping piece. The mount and the clamping piece have conical clamping faces which coact to provide a reliable attachment which is easy to assemble. The conical clamping piece is arranged so as to be axially displaceable in the mount to conjointly define a clamping gap with the mount. The clamping piece closes the clear cross section of the end portion of the flexible member in an airtight manner.

12 Claims, 2 Drawing Sheets

AIR SPRING HAVING A SLEEVE-LIKE FLEXIBLE MEMBER

FIELD OF THE INVENTION

The invention relates to a sleeve-type air spring having a sleeve-like flexible member made of elastomeric material with the flexible member having at least one beadless end portion. The end portion is clamped to a mount by clamping the same between the mount and a clamping piece.

BACKGROUND OF THE INVENTION

Cylindrical or conical flexible members are utilized in air springs for motor vehicles. The flexible members are produced from a hollow cylindrical sleeve-like body made of an elastomeric material having a reinforcement lining. The end portions of the sleeve-like flexible member must be attached to holding elements of the vehicle parts which are resiliently suspended with respect to each other. The holding elements are movable relative to each other.

In general, metal clamping rings have been used for attaching the end portions of the sleeve-like flexible member to supporting elements or other mounts. The clamping ring is tightly mounted by means of plastic shaping to obtain a reliable clamping at high tension forces. However, it can be disadvantageous if the clamping ring presses too tightly against the end portion since this can lead to damage of the elastomeric material and to the stability of the supporting position. Damage to the attachment mounts can also not be precluded.

SUMMARY OF THE INVENTION

It is an object of the invention to provide a sleeve-type air spring of the kind described above which ensures a reliable constructive attachment which is easy to assemble and wherein the danger of damage to the embedded supporting position is minimized.

The air spring according to the invention includes a flexible member made of elastomeric material having an annular beadless end portion; a mount having a first conical clamping face and defining a longitudinal axis; a clamping piece having a second conical clamping face; and, the clamping piece being displaceable along the axis toward the mount so as to cause the clamping faces to conjointly define a clamping gap for clamping the end portion therein to form an airtight seal.

The air spring is preferably a sleeve-type air spring and the flexible sleeve is preferably a sleeve-like flexible member.

The mount and clamping piece hold the beadless end portion of the sleeve-like flexible member between their conical clamping faces. In this way, the clamping piece is arranged in the interior of the end portion and the mount is arranged at the outer periphery of this end portion. The axial displacement of the conical clamping piece causes the clamping piece to be forced against the mount during operation of the flexible member because it is charged by the internal pressure in the direction of the mount. This leads to a tightening of the end portion in the clamping gap between the conical clamping faces of the mount and the clamping piece. The inner pressure of the sleeve-like flexible member effects the attachment of the end portion. The internal pressure of the air spring is advantageously utilized for a self-clamping function of the sleeve-like flexible member.

The clamping parts preferably define a clamping interface which has a circular shape when viewed in section with the clamping piece being arranged concentrically to the mount.

According to the embodiment of the invention, the clamping piece has a truncated conical configuration and the conical surface of this clamping piece defines the clamping face thereof.

According to another embodiment of the invention, guide means are provided for guiding the clamping piece in the mount. The guide means includes a centric bore formed in the mount along the longitudinal axis thereof and the clamping piece is provided with a projection formed centrically thereon for engaging the bore when the clamping piece is displaced toward the mount. The clamping piece is charged by the internal pressure of the air spring and is guided centrically toward the surrounding mount by the guide means so that the peripheral clamping gap has the same clear width over its entire periphery.

In another embodiment of the invention, the clamping piece has a pan-shaped configuration having an outwardly extending conically shaped wall defining the clamping face of the clamping piece. This configuration provides a substantial reduction in the overall weight of the assembled air spring.

According to still another embodiment of the invention, the projection of the clamping piece and the bore of the mount conjointly define a holding interface including a first set of holding teeth formed in the bore and a second set of holding teeth formed on the projection. The flexible holding teeth can for example be made of a suitable plastic in the case of the clamping piece. The engagement of these flexible holding teeth in corresponding flexible holding teeth of the opening in the mount makes a reliable clamping possible so that tension forces can be transmitted when there is a drop of pressure in the sleeve-like flexible member.

According to still another embodiment of the invention, a peripheral rib is formed on at least one of the clamping faces to narrow the gap therebetween. Accordingly, a significant narrowing of the wall of the end portion of the flexible member is provided in the region of the peripheral rib so that a slippage of this end portion with respect to the clamping face is prevented in response to a tension load.

The annular end portion of the sleeve-like flexible member has an inner diameter of a predetermined diameter value before the air spring is taken into service by charging the sleeve with gas under pressure. The peripheral rib then has a diameter slightly greater in magnitude than this predetermined diameter value. This configuration is of assistance during assembly. The clamping piece is inserted into the interior of the end portion of the sleeve-like flexible member until it is almost flush and self clamps in this end portion to close off the cross section of the flexible member in an airtight manner. The end of the flexible member can now be guided into the stationary mount which, for example, is on the motor vehicle. After the flexible member is charged with pressure, the end portion is attached and clamped in a simple manner to this mount. During clamping, the end portion adapts to the conicality of the clamp.

With the invention, the inner pressure of the sleeve-like flexible member is utilized in the operation of the air spring to provide a self clamping via axial displacement of the inner clamping piece. The intermediate space defining the clamping gap between the conical clamping piece and the conical mount is pressed together with the wall of the flexible member clamped therebetween. In this way, the flexible member is tightly clamped and sealed.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
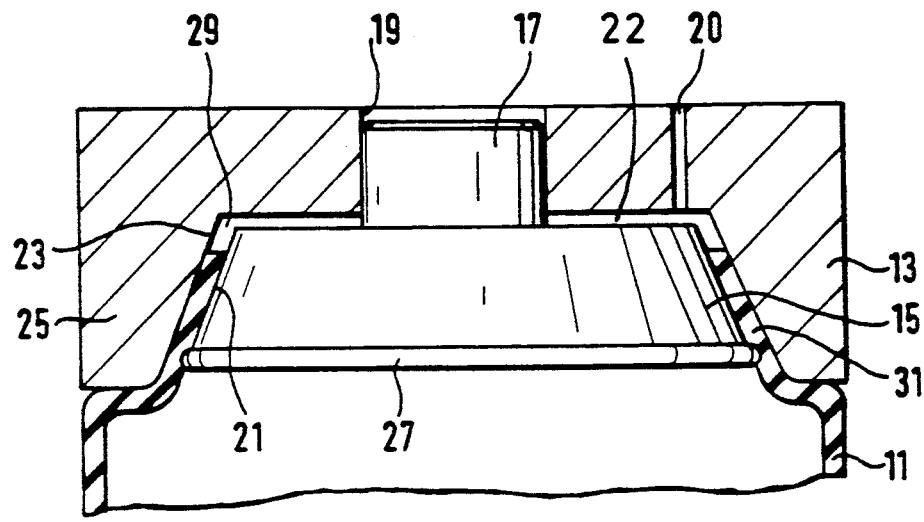
FIG. 1 is an axial section view of an air spring according to the invention showing the upper clamping of the end portion of the sleeve-like flexible member.

In FIG. 1, a beadless sleeve-like flexible member 11 is shown clamped between a mount 13 attached to a vehicle (not shown) and a concentric clamping piece 15. The clamping piece 15 is axially guided with a centrically arranged projection 17 in a centric bore 19 of the mount 13.

The clamping piece 15 is a truncated conical body having a conically extending outer face 21. The inclination of the outer surface 21 corresponds to the inclination of the inner conical peripheral surface 23 of the mount 13. The inner peripheral surface 23 is arranged in a bell-shaped projection 25 of the mount 13.

The clamping piece 15 has an end facing toward the flexible member 11 and a peripheral rib 27 is provided at this end. The peripheral rib 27 substantially narrows the clamping gap 29 between the peripheral faces 21 and 23. The wall of an end portion 31 of the flexible member 11 is clamped between the peripheral clamping faces 21 and 23 and the flexible member is shown expanded to its operating diameter.

The intermediate space 22 between the clamping piece 15 and the mount 13 changes with respect to its volume when the flexible member is charged with pressure. The intermediate space 22 is vented via a bore 20.

The outer diameter of the peripheral rib 27 is somewhat larger than the inner diameter of the flexible member 11 when the latter is not under pressure in advance of being taken into service for the first time. During assembly, the clamping piece 15 is inserted into the end portion 31 of the flexible member 11 up to the elevation shown in FIB. 1. During assembly on the vehicle, the end portion 31 can be introduced simply into the mount 13. The inner pressure acts against the clamping piece 15 when the flexible member 11 is charged with pressure so that a self clamping of the end portion 31 of the flexible member 11 between the clamping faces 21 and 23 is obtained.

Figure 2:
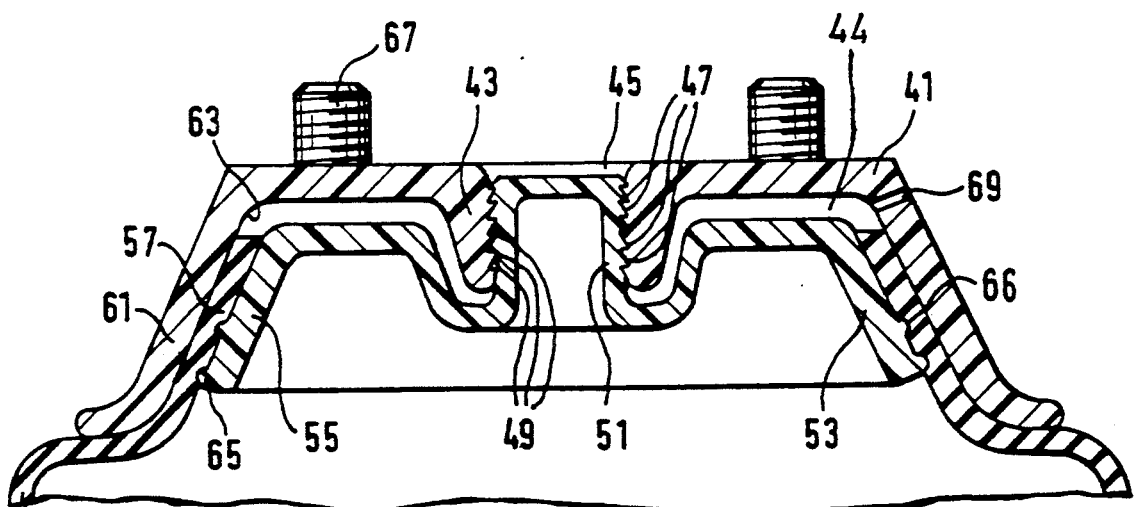
FIG. 2 is an axial section of an alternate embodiment of the air spring of the invention showing the end portion of the sleeve-like flexible member clamped between two conical clamping surfaces; and, FIG. 3 is an axial section showing still another embodiment of the invention wherein the end portion of the sleeve-type flexible member is clamped between two conical clamping faces which have inclinations deviating from each other.

The modified embodiment shown in FIG. 2 includes thin-walled clamping pieces each having a bell or pan shape. This arrangement saves weight and the clamping pieces are advantageously made of a suitable plastic. The clamping piece in the form of mount 41 is attached to the vehicle to be suspended and has a central cylindrical projection 43 which is directed inwardly. The projection 43 is provided with an opening 45. The inner wall of the opening 45 is provided with flexible holding teeth 47. The flexible holding teeth 47 mesh with flexible holding teeth 49 of a central projection 51 of the pan-shaped clamping piece 53 when in the operating position wherein clamping is effected. The peripheral rim 55 of the clamping piece 53 expands conically (when viewed in axial section) in the direction of the flexible member 59 clamped at an end portion 57 thereof.

The conical clamping piece 53 is surrounded by a conical peripheral wall 61 expanding at the same inclination. A clamping gap 63 is formed between the peripheral rim 55 and the peripheral wall 61. The clamping gap 63 is reduced at its lower end by a peripheral rib 65 of the clamping piece 53. One or more additional peripheral ribs can be provided as exemplified by rib 66.

The mount 41 is attached via threaded studs 67 to a vehicle. The intermediate space 44 between the pressure piece 53 and the mount 41 changes with respect to its volume during the application of pressure and is vented via a bore 69.

The clamping piece 53 is inserted during preassembly into the end portion 57 of the flexible member 59. The complete assembly takes place on the vehicle itself. The mount 41 is attached to the part of the vehicle to be suspended. The end portion of the flexible member 59 is introduced into the mount 41 so that the central projections 43 and 51 are disposed opposite each other. The projections 43 and 51 are provided with holding teeth and when the pressure is applied to place the air spring into service, the projection 51 jumps into the bore 45 and the holding teeth 47 and 49 mutually engage so that a reliable hold is ensured even in the event that pressure is no longer present in the interior of the flexible member. Tension forces can be transmitted when pressure is lot in the flexible member.

Figure 3:
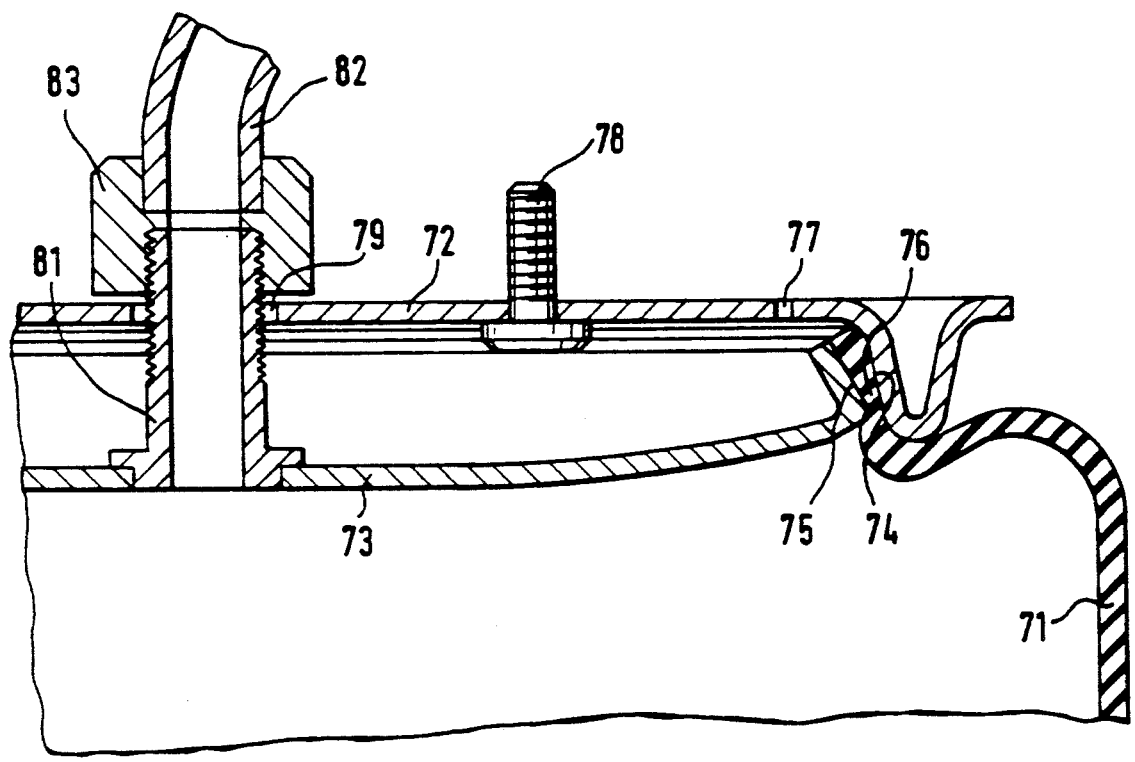

In the clamping arrangement according to FIG. 3, the beadless sleeve-like flexible member 71 is clamped between an outer mount 72 and an inner clamping piece 73. The conical clamping faces 74 and 75 of the mount 72 and the clamping piece 73, respectively, have conicalities different from each other with the different inclinations of the clamping faces 74 and 75 being so aligned that the narrowest location of the clamping gap 76 is at the end of the gap facing toward the main portion of the flexible member 71.

The space between mount 72 and the clamping piece 73 is connected to the atmosphere via a venting bore 77. The outer mount 72 is provided with threaded studs 78 of which one is shown. The inner clamping piece 73 has a centric parallel stub 81 projecting upwardly through the bore 79 of the mount 72. The hollow stub 81 is provided with an outer winding and communicates with an air supply line 82 arranged outside of the mount 72. The hollow stop 81 is threadably connected to the air supply line 82 via a surrounding nut 83.

It is understood that the foregoing description is that of the preferred embodiments of the invention and that various changes and modifications may be made thereto without departing from the spirit and scope of the invention as defined in the appended claims.

What is claimed is:

1. An air spring comprising:
   a flexible member defining an interior space under pressure;
   said flexible member being made of elastomeric material and having an annular beadless end portion;

a mount having a first conical clamping face and defining a longitudinal axis;

a clamping piece disposed within said end portion and having a second conical clamping face; and, said clamping piece being displaceably located within said interior space so as to be movable along said axis toward said mount in response to said pressure so as to cause said clamping faces to conjointly define a clamping gap for clamping said end portion therein to form an airtight seal.

2. The air spring of claim 1, wherein said air spring is a sleeve-shaped air spring and said flexible member is a sleeve-shaped flexible member.

3. The air spring of claim 2, said clamping piece having a truncated conical configuration.

4. The air spring of claim 2, further comprising guide means for guiding said clamping piece in said mount.

5. The air spring of claim 4, said guide means including a bore formed in said mount along said axis; and, said clamping piece having a projection formed centrically thereon for engaging said bore when said clamping piece is displaced toward said mount.

6. The air spring of claim 5, said projection and said bore conjointly defining a latching interface when said projection is seated in said bore.

7. The air spring of claim 6, said latching interface including a first set of holding teeth formed in said bore and a second set of holding teeth formed on said projection and engaging said first set of holding teeth when said projection is inserted into said bore.

8. The air spring of claim 2, said clamping piece having a pan-shaped configuration having an outwardly extending conically shaped wall defining said second clamping face.

9. The air spring of claim 2, further comprising a peripheral rib formed on at least one of said clamping faces to narrow said gap.

10. The air spring of claim 9, said annular end portion of said flexible member having an inner diameter of a predetermined diameter before the air spring is taken into service for the first time by filling the flexible member with a gas; and, said peripheral rib having a diameter slightly greater in magnitude than said predetermined diameter.

11. The air spring of claim 2, further comprising a plurality of peripheral ribs formed on at least one of said clamping faces.

12. The air spring of claim 2, said clamping faces being formed with respective conicalities different from each other.

* * * * *

UNITED STATES PATENT AND TRADEMARK OFFICE
CERTIFICATE OF CORRECTION

PATENT NO. : 5,127,641

DATED : July 7, 1992

INVENTOR(S) : Eckhard Schneider

It is certified that error appears in the above-identified patent and that said Letters Patent is hereby corrected as shown below:

In the title page, under "References Cited": delete "4,890,823  1/1990  Keschinat et al ..... 267/64.27" and substitute
-- 4,890,823  1/1990  Koschinat et al ..... 267/64.27 -- therefor.

In the title page, under "Attorney, Agent, or Firm": delete "Welter Ottesen" and substitute -- Walter Ottesen -- therefor.

In column 2, line 5: delete "the" (first occurrence) and substitute -- an -- therefor.

In column 3, line 55: delete "FIB. 1" and substitute -- FIG. 1 -- therefor.

In column 4, line 37: delete "lot" and substitute -- lost -- therefor.

Signed and Sealed this

Seventh Day of September, 1993

Attest:

BRUCE LEHMAN

Attesting Officer  Commissioner of Patents and Trademarks